US010225189B2

(12) United States Patent
Tambakuwala et al.

(10) Patent No.: US 10,225,189 B2
(45) Date of Patent: Mar. 5, 2019

(54) EGRESS PEER ENGINEERING USING IPV4-MAPPED IPV6 ADDRESSES

(71) Applicant: Juniper Networks, Inc., Sunnyvale, CA (US)

(72) Inventors: Himanshu Kumar Tambakuwala, Bangalore (IN); Nipun Chawla, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 323 days.

(21) Appl. No.: 15/138,908

(22) Filed: Apr. 26, 2016

(65) Prior Publication Data

US 2017/0310589 A1    Oct. 26, 2017

(51) Int. Cl.
| | |
|---|---|
| *H04L 12/757* | (2013.01) |
| *H04L 12/723* | (2013.01) |
| *H04L 12/749* | (2013.01) |
| *H04L 29/12* | (2006.01) |
| *H04L 12/715* | (2013.01) |
| *H04W 88/16* | (2009.01) |

(52) U.S. Cl.
CPC .......... *H04L 45/741* (2013.01); *H04L 45/023* (2013.01); *H04L 45/04* (2013.01); *H04L 45/50* (2013.01); *H04L 61/25* (2013.01); *H04L 61/6004* (2013.01); *H04L 61/103* (2013.01); *H04W 88/16* (2013.01)

(58) Field of Classification Search
CPC ... H04L 45/741; H04L 45/04; H04L 61/6004; H04L 61/25; H04L 45/023; H04L 45/50; H04L 61/103; H04W 88/16
See application file for complete search history.

(56) References Cited

U.S. PATENT DOCUMENTS

| | | |
|---|---|---|
| 6,603,756 B1 | 8/2003 | Tappan |
| 7,804,848 B2 | 9/2010 | Mirtorabi et al. |

(Continued)

FOREIGN PATENT DOCUMENTS

| CN | 100405797 | 7/2008 |
|---|---|---|

OTHER PUBLICATIONS

Gredler et al., Egress Peer Engineering using BGP-LU, Inter-Domain Routing, Internet-Draft, Mar. 11, 2016, draft-gredler-idr-bgplu-epe-05.*

(Continued)

*Primary Examiner* — Shailendra Kumar
(74) *Attorney, Agent, or Firm* — Harrity & Harrity, LLP

(57) ABSTRACT

A first device may determine an Internet Protocol version R (IPvR) interface address associated with a second device, where R is greater than or equal to four. The first device and the second device may be associated with an external border gateway protocol peering session. The first device may generate an Internet Protocol version S (IPvS) interface address based on the IPvR interface address associated with the second device, where S is greater than or equal to six and different than R. The first device may store the IPvS interface address in a routing table. The first device may receive, from the second device, a service route that includes the IPvS interface address, and may provide the service route to a third device. The first device may provide a labeled route to the third device. The labeled route may include a label associated with the IPvS interface address.

20 Claims, 7 Drawing Sheets

(56) References Cited

U.S. PATENT DOCUMENTS

| | | | |
|---|---|---|---|
| 8,385,332 B2 | 2/2013 | Aggarwal | |
| 8,571,029 B1 | 10/2013 | Aggarwal et al. | |
| 2013/0031271 A1* | 1/2013 | Bosch | H04W 40/36 |
| | | | 709/245 |
| 2013/0155845 A1* | 6/2013 | Patel | H04L 45/04 |
| | | | 370/225 |
| 2015/0304206 A1 | 10/2015 | Filsfils et al. | |
| 2015/0372913 A1 | 12/2015 | Van de Velde et al. | |
| 2017/0118043 A1* | 4/2017 | Hao | H04L 12/4633 |
| 2017/0142636 A1* | 5/2017 | Joshi | H04W 40/005 |

OTHER PUBLICATIONS

Hinden et al., IP Version 6 Addressing Architecture, Network Working Group, Feb. 2006, RFC 4291.*

Gredler et al., "Egress Peer Engineering using BGP-LU," http://www.potaroo.net/ietf/idref/draft-gredler-idr-bgplu-epe/, Mar. 11, 2016, 13 pages.

Juniper Networks, "MPLS and Routing Tables," http://www.juniper.net/documentation/en_US/junos13.3/topics/concept/mpls-routing-tables.html, Jun. 23, 2015, 2 pages.

Hinden et al., "IP Version 6 Addressing Architecture", Network Working Group, Feb. 2006, 25 pages, XP015054931.

Cleroq et al., "Connecting IPv6 Islands over IPv4 Mpls Using IPv6 Provider Edge Routers (6PE)", Network Working Group, Feb. 2007, 14 pages, XP015052395.

Extended European Search Report corresponding to EP 16 18 6390 dated Aug. 31, 2017, 11 pages.

\* cited by examiner

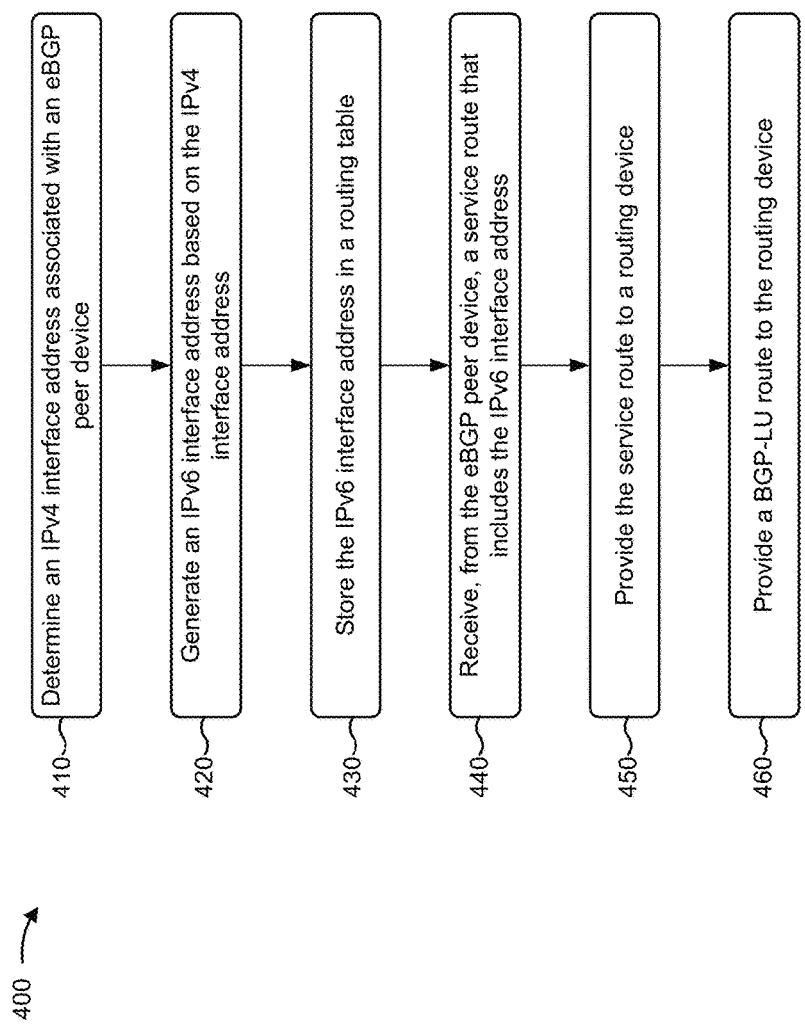

EGRESS PEER ENGINEERING USING IPV4-MAPPED IPV6 ADDRESSES

BACKGROUND

The Border Gateway Protocol (BGP) is a standardized exterior gateway protocol designed to exchange routing and reachability information among autonomous systems (ASs) on the Internet. BGP-labeled-unicast (BGP-LU) may be used as an inter-AS routing protocol, and may advertise a Multiprotocol Label Switching (MPLS) transport path between interior gateway protocol (IGP) regions and autonomous systems. BGP-LU may be used for traffic-engineering purposes in relation to autonomous systems.

SUMMARY

According to some possible implementations, a first device may include one or more processors to determine an Internet Protocol version R (IPvR) interface address associated with a second device, where R is greater than or equal to four. The first device and the second device may be associated with an external border gateway protocol peering session. The one or more processors may generate an Internet Protocol version S (IPvS) interface address based on the IPvR interface address associated with the second device, where S is greater than or equal to six and different than R. The one or more processors may store the IPvS interface address in a routing table based on generating the IPvS interface address. The one or more processors may receive, from the second device, a service route that includes the IPvS interface address. The one or more processors may provide, to a third device, the service route based on receiving the service route. The first device and the third device may be associated with an internal border gateway protocol peering session. The one or more processors may provide, to the third device, a labeled route based on providing the service route to the third device. The labeled route may include a label associated with the IPvS interface address.

According to some possible implementations, a non-transitory computer-readable medium may store one or more instructions that, when executed by one or more processors of a first device, cause the one or more processors to determine an Internet Protocol version R (IPvR) address associated with a second device, where R is greater than or equal to four. The first device may be associated with a first autonomous system, and the second device may be associated with a second autonomous system that is different than the first autonomous system. The one or more instructions may cause the one or more processors to generate an Internet Protocol version S (IPvS) address based on the IPvR address associated with the second device, where S is greater than or equal to R. The one or more instructions may cause the one or more processors to receive, from the second device, a service route that includes the IPvS address and an IPvS prefix. The one or more instructions may cause the one or more processors to provide, to a third device, the service route based on receiving the service route. The third device may be associated with the first autonomous system. The one or more instructions may cause the one or more processors to provide, to the third device, a labeled route based on providing the service route to the third device. The labeled route may include a label associated with the IPvS address.

According to some possible implementations, a method may include determining, by a first device, an Internet Protocol version R (IPvR) address associated with a second device, where R is greater than or equal to four. The first device and the second device may be associated with an external border gateway protocol peering session. The method may include generating, by the first device, an Internet Protocol version S (IPvS) address based on the IPvR address associated with the second device, where S is greater than or equal to six. The method may include receiving, by the first device and from the second device, a service route that includes the IPvS address. The method may include providing, by the first device and to a third device, the service route based on receiving the service route. The method may include providing, by the first device and to the third device, a labeled route based on providing the service route. The labeled route may include a label associated with the IPvS address associated with the second device.

BRIEF DESCRIPTION OF THE DRAWINGS

FIG. 4 is a flow chart of an example process for enabling egress peer engineering using IPv4-mapped IPv6 addresses.

DETAILED DESCRIPTION

The following detailed description of example implementations refers to the accompanying drawings. The same reference numbers in different drawings may identify the same or similar elements.

Egress peer engineering using BGP-LU enables autonomous system boundary routers (ASBRs) to receive service routes, using the external BGP (eBGP), from ASBRs associated with other autonomous systems. For example, an ASBR of a first autonomous system may establish a BGP peering session with a peer ASBR of a second autonomous system via an inter-AS link. Additionally, the ASBR may store, in a routing table, an address (e.g., an Internet Protocol version 4 (IPv4) interface address, a media access control (MAC) address, or the like) associated with the peer ASBR. In this way, the ASBR may receive service routes from the peer ASBR and may resolve the service routes based on the routing table (e.g., performing a lookup). For example, a service route may include information that identifies a prefix and a next-hop address (e.g., an interface address associated with the peer ASBR) associated with the prefix.

Additionally, egress peer engineering using BGP-LU enables ASBRs to advertise, using the internal BGP (iBGP), the service routes to other routing devices within the same autonomous system (e.g., via an iBGP mesh). Further, an ASBR may advertise a BGP-LU route that includes the next-hop address and a label associated with the next-hop address. In this way, an ingress router may control a selected next-hop, associated with another autonomous system, based on pushing a particular label onto network traffic.

However, in some cases, an ASBR may receive a service route including an Internet Protocol version 6 (IPv6) prefix and an IPv6 next-hop address (e.g., an IPv4-mapped IPv6 address) from a peer ASBR. In such cases, the ASBR may be unable to resolve the IPv6 next-hop address, and may thus fail to advertise the service route to the iBGP mesh. For example, if a peer ASBR advertises an IPv6 prefix to the ASBR, then the peer ASBR may advertise an IPv4-mapped IPv6 interface address as the next-hop address. Implementations described herein may enable egress peer engineering using IPv4-mapped IPv6 addresses. Additionally, implementations described herein may enable an ASBR to map IPv4 interface addresses to IPv6 interface addresses, and store the IPv6 interface addresses in a routing table. In this way, implementations described herein may enable an ASBR to resolve service routes that include IPv6 prefixes and IPv6 next-hop addresses, thereby enabling the ASBR to advertise the service route to other routing devices within an autonomous system. Implementations described herein may conserve processor and/or memory resources of an ASBR and may conserve network resources by reducing a quantity of unresolvable routes.

Figure 1A:
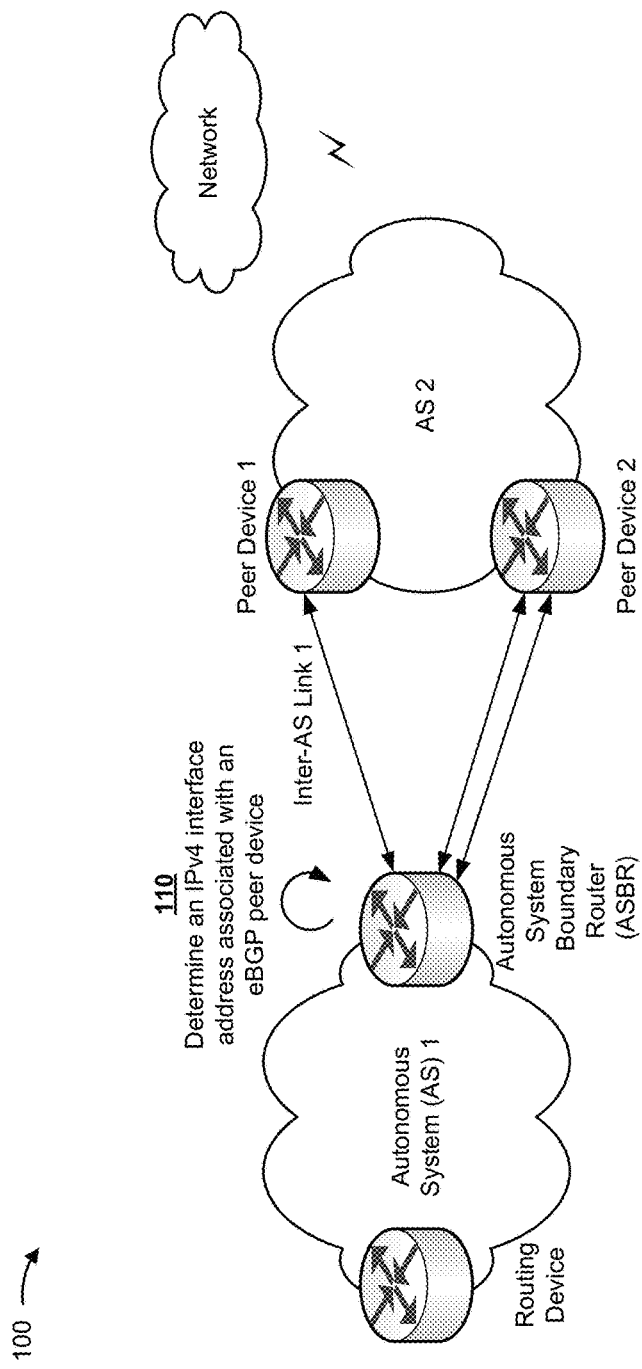
FIGS. 1A-1D are diagrams of an overview of an example implementation described herein.

FIGS. 1A-1D are diagrams of an overview of an example implementation 100 described herein. As shown in FIG. 1A, and by reference number 110, an ASBR may determine an IPv4 interface address associated with an eBGP peer device (e.g., another ASBR associated with another AS, such as Peer Device 1 and/or Peer Device 2). For example, as shown, the ASBR may establish an inter-AS link with Peer Device 1, and may establish multiple inter-AS links with Peer Device 2. Each inter-AS link may connect an interface of the ASBR with an interface of a corresponding Peer Device. For example, Inter-AS Link 1 may connect an interface (e.g., associated with the IPv4 interface address "104.0.0.1") of the ASBR to an interface (e.g., associated with the IPv4 interface address "104.0.0.0") of the Peer Device 1. In some implementations, the ASBR may receive configuration information that identifies the IPv4 interface address of the Peer Device 1 based on a configuration (e.g., a configuration associated with egress peer engineering, BGP, or the like), and may store the IPv4 interface address in a routing table. Additionally, the ASBR may use the address resolution protocol (ARP) to map the IPv4 interface address of Peer Device 1 to a physical address (e.g., a media access control (MAC) address). Additionally, the ASBR may determine the IPv4 interface address associated with the eBGP peer device based on the configuration information.

Figure 1B:
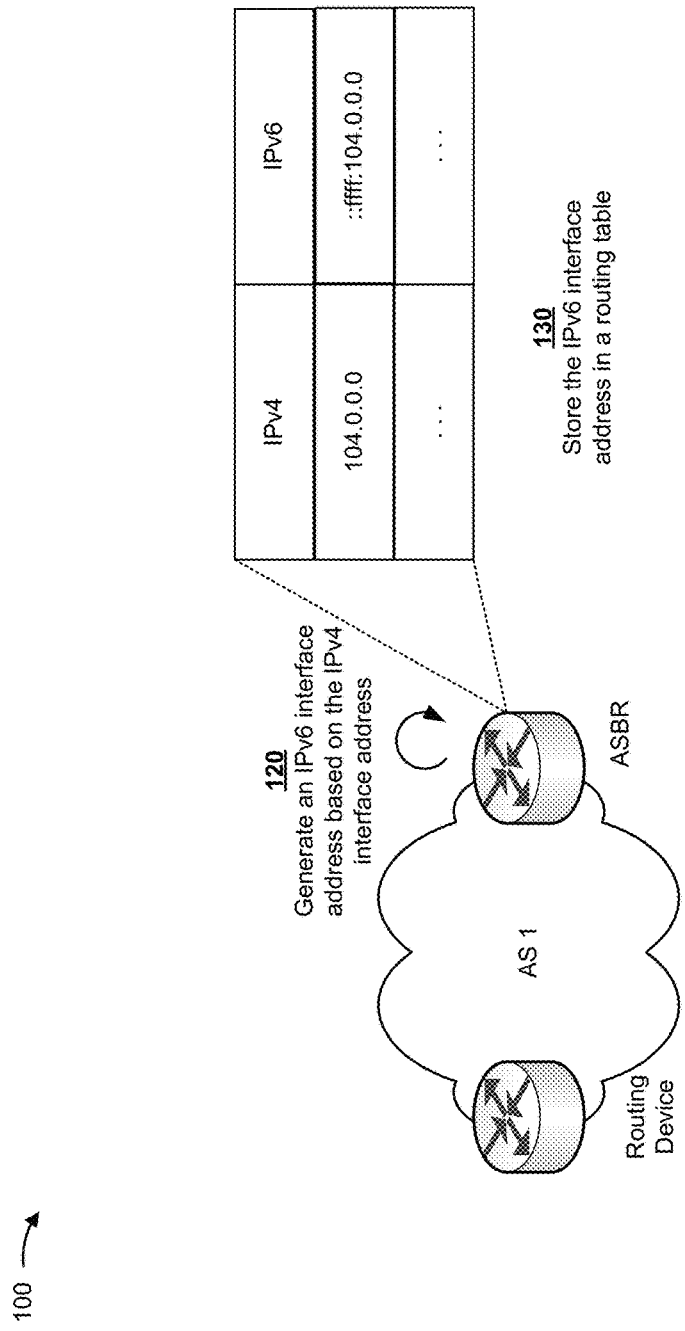

As shown in FIG. 1B, and by reference number 120, the ASBR may generate an IPv6 interface address based on the IPv4 interface address. For example, the ASBR may generate an IPv4-mapped IPv6 interface address that includes an 80-bit prefix of zeros, 16 bits that include the value one, and 32 bits that contain the IPv4 interface address. As shown by reference number 130, the ASBR may store the IPv6 interface address in a routing table. For example, the ASBR may store the IPv6 interface address in an IPv6 MPLS routing table.

Figure 1C:
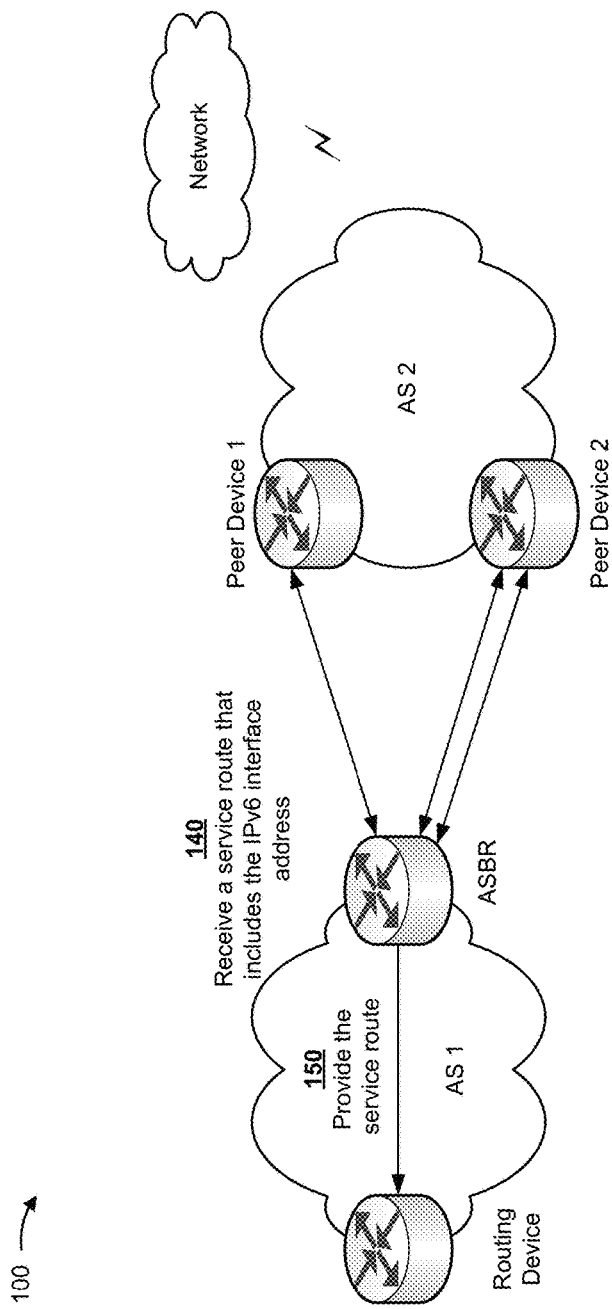

As shown in FIG. 1C, and by reference number 140, the ASBR may receive, from the Peer Device 1, a service route that includes the IPv6 interface address. For example, the service route may include an IPv6 prefix (e.g., associated with destination devices that may be associated with a network that is reachable via AS 2), and the IPv6 interface address as the next-hop address for the IPv6 prefix. For example, assume that the ASBR resolves the next-hop address (e.g., based on performing a lookup in the routing table). As shown by reference number 150, the ASBR may provide the service route to a routing device (e.g., an ingress router associated with AS 1). For example, the ASBR may provide a BGP message that includes the IPv6 prefix and the next-hop IPv6 interface address.

Figure 1D:
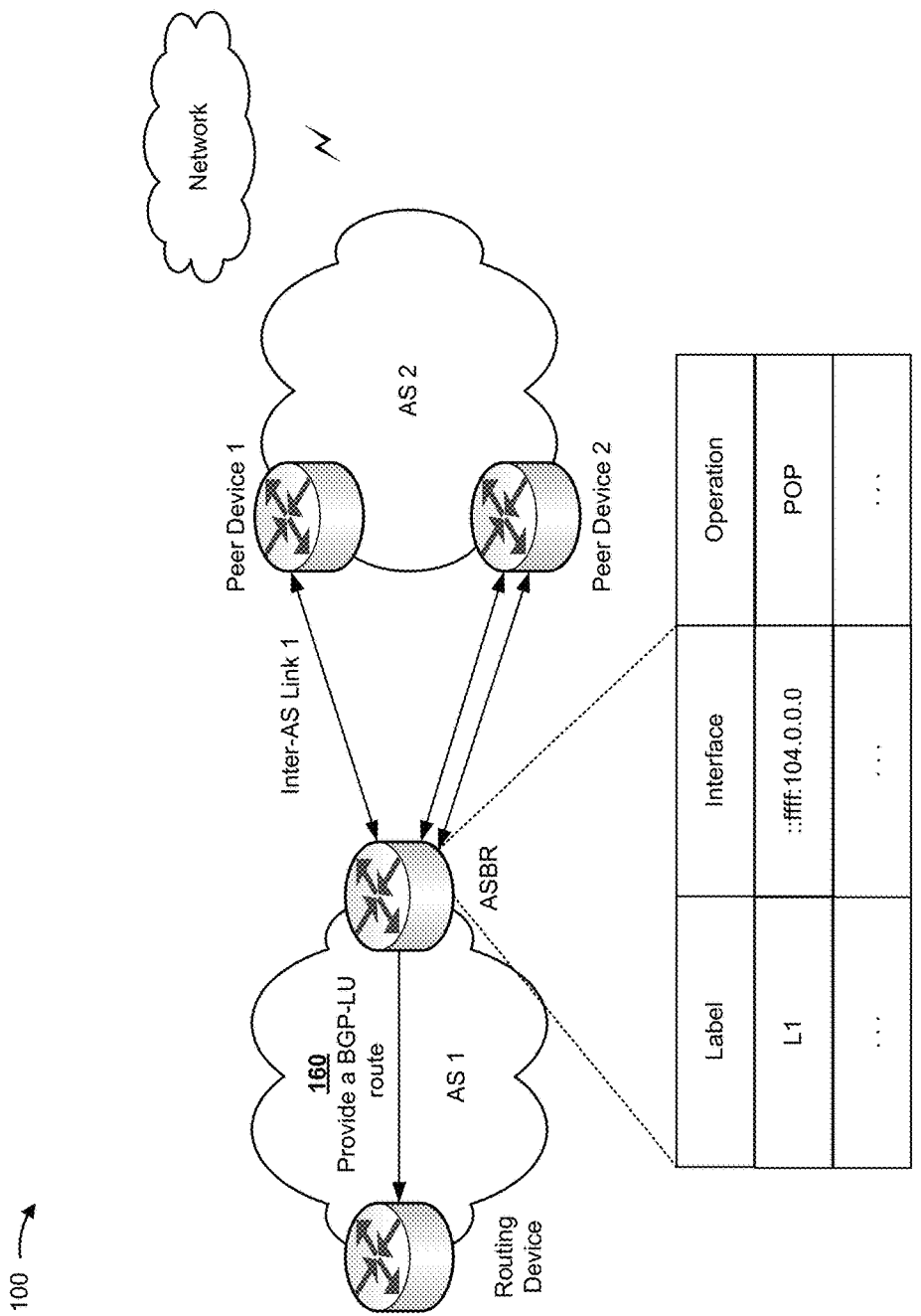

As shown in FIG. 1D, and by reference number 160, the ASBR may provide a BGP-LU route to the routing device. For example, the ASBR may provide a BGP message that advertises the BGP-LU route, and that includes information that identifies the IPv6 interface address associated with the interface of the Peer Device 1, a label associated with IPv6 interface address, and a BGP next-hop address (e.g., a loopback address of the ASBR). In this way, the routing device may receive network traffic that includes a destination address associated with the IPv6 prefix and may provide, to the ASBR, the network traffic including a label associated with the IPv6 interface address of the Peer Device 1 (e.g., by performing a "push" operation). In this way, the routing device may provide the network traffic to the ASBR, and the ASBR may select an egress link (e.g., inter-AS link 1) based on the label associated with the network traffic.

As indicated above, FIGS. 1A-1D are provided merely as an example. Other examples are possible and may differ from what was described with regard to FIGS. 1A-1D.

Implementations described herein may enable an ASBR to receive, from eBGP peer devices (e.g., other ASBRs associated with other autonomous systems), service routes that include IPv6 prefixes and IPv6 next-hop addresses and resolve the IPv6 next-hop addresses. Additionally, implementations described herein may enable an ASBR to support egress peer engineering using BGP-LU. In this way, implementations described herein may reduce a quantity of service routes that are not resolvable, thereby conserving processor and/or memory resources of an ASBR.

While the description, herein, will focus on IPv4 and IPv6 interface addresses, the description is not limited to IPv4 and IPv6 interface addresses and may equally apply to other versions of IP addresses (e.g., IPvR (R≥4) and IPvS (S≥6, S>R, and/or S≠R) and/or other types of addresses, such as MAC addresses or the like.

Figure 2:
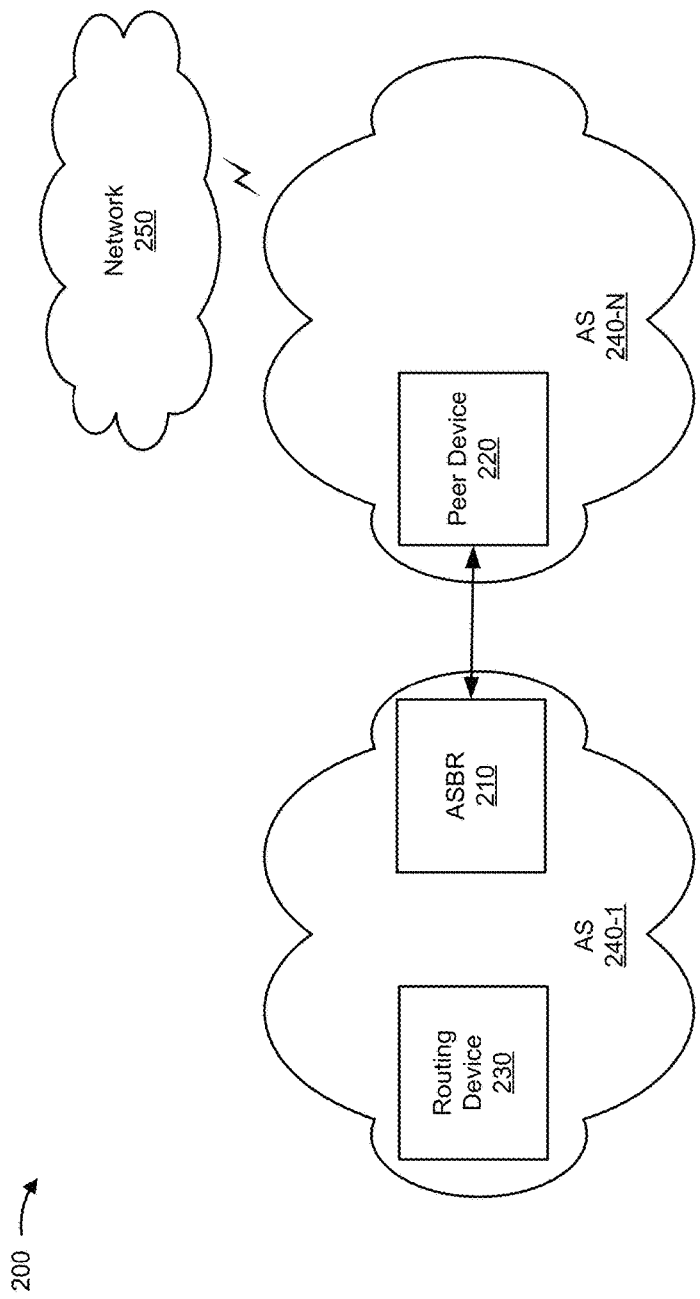
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ASBR 210, a peer device 220, a routing device 230, one or more autonomous systems 240-1 through 240-N (N≥1) (hereinafter referred to collectively as "autonomous systems 240," and individually as "autonomous system 240"), and a network 250. Devices of environment 200 may interconnect via wired connections, wireless connections, or a combination of wired and wireless connections.

ASBR 210 includes one or more devices capable of receiving and/or providing network traffic (e.g., packets). For example, ASBR 210 may include a traffic transfer device, such as a router, a routing component, a switch, a gateway, a firewall, a hub, a bridge, a reverse proxy, a server (e.g., a proxy server, a server executing a virtual machine, etc.), a security device, an intrusion detection device, a load balancer, or a similar device. In some implementations, ASBR 210 may establish an eBGP peering session with peer device 220, and/or may establish an iBGP peering session with routing device 230. In some implementations, ASBR 210 may represent an egress router or an ingress router associated with autonomous system 240-1 based on a perspective of a traffic route.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Peer device 220 includes one or more devices capable of receiving and/or providing network traffic. For example, peer device 220 may include a traffic transfer device, such as a router, a routing component, a switch, a gateway, a firewall, a hub, a bridge, a reverse proxy, a server (e.g., a proxy server, a server executing a virtual machine, etc.), a security device, an intrusion detection device, a load balancer, or a similar device. In some implementations, peer device 220 may represent an ASBR of autonomous system 240-N.

Routing device 230 includes one or more devices capable of receiving and/or providing network traffic. For example, routing device 230 may include a traffic transfer device, such as a router, a routing component, a switch, a gateway, a firewall, a hub, a bridge, a reverse proxy, a server (e.g., a proxy server, a server executing a virtual machine, etc.), a security device, an intrusion detection device, a load balancer, or a similar device. In some implementations, routing device 230 may represent an ingress router associated with autonomous system 240-1, and may exchange routing information with ASBR 210 via iBGP.

Autonomous system 240 includes one or more wired and/or wireless networks of connected Internet Protocol (IP) routing prefixes that are under the control of one or more network operators on behalf of an administrative entity or domain.

Network 250 includes one or more wired and/or wireless networks. For example, network 250 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
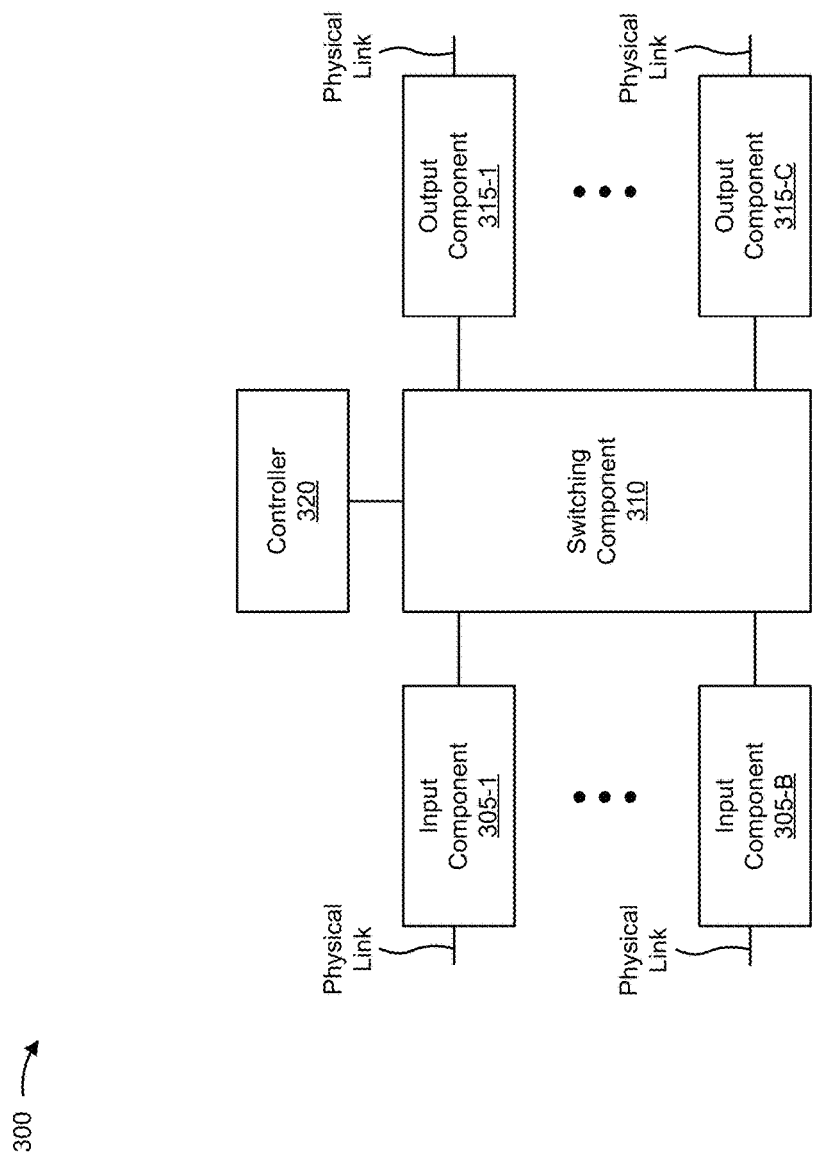
FIG. 3 is a diagram of example components of one or more devices of FIG. 2.

FIG. 3 is a diagram of example components of a device 300. Device 300 may correspond to ASBR 210, peer device 220, and/or routing device 230. In some implementations, ASBR 210, peer device 220, and/or routing device 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for enabling egress peer engineering using IPv4-mapped IPv6 addresses. In some implementations, one or more process blocks of FIG. 4 may be performed by ASBR 210. In some implementations, one or more process blocks of FIG. 4 may be performed by another device or a group of devices separate from or including ASBR 210, such as peer device 220 and/or routing device 230.

As shown in FIG. 4, process 400 may include determining an IPv4 interface address associated with an eBGP peer device (block 410). For example, ASBR 210 may determine a next-hop IPv4 interface address associated with peer device 220. In some implementations, ASBR 210 may store, in a first routing table (e.g., an IPv4 MPLS routing table), a next-hop IPv4 interface address associated with peer device 220 based on establishing a BGP peering session with peer device 220 and/or based on an egress peer engineering configuration. For example, ASBR 210 and peer device 220 may establish a BGP peering session which may enable ASBR 210 and peer device 220 to exchange routing information (e.g., BGP messages). In some implementations, ASBR 210 may receive configuration information (e.g., from a network operator), and may establish the peering session with peer device 220 based on receiving the configuration information.

In some implementations, ASBR 210 may receive configuration information associated with egress peer engineering (e.g., a network operator may configure ASBR 210 to support egress peer engineering). In this case, ASBR 210 may receive information that identifies an address (e.g., a next-hop IPv4 interface address, a loopback address, or the like) associated with peer device 220. Additionally, ASBR 210 may store the address in the first routing table (e.g., the IPv4 MPLS routing table). In some implementations, ASBR 210 may include one or more inter-AS links with peer device 220. For example, an inter-AS link may directly or indirectly connect an interface associated with ASBR 210 with an interface of peer device 220.

In some implementations, ASBR 210 and peer device 220 may exchange routing information via an inter-AS link. For example, peer device 220 may provide, to ASBR 210, routing information (e.g., a BGP UPDATE message) that advertises a service route. As used herein, a service route may include information that pairs endpoints with attributes of a path to the endpoints. For example, the endpoints may include systems having IP addresses that are contained in a prefix (e.g., an IP address prefix). In some implementations, peer device 220 may provide, to ASBR 210, routing information to advertise peer device 220 as a next-hop to a prefix. For example, a BGP message may include one or more prefixes (e.g., associated with a network layer reachability information (NLRI) field), and one or more interface addresses of peer device 220 (e.g., associated with a path attribute field). In this way, ASBR 210 may receive, from peer device 220, routing information that advertises a service route, may resolve a next-hop address associated with the service route (e.g., based on an entry in the first routing table), and may advertise the service route to routing device 230, as described elsewhere herein. Additionally, ASBR 210 may assign a label to the next-hop address, and may advertise the label to routing device 230, as described elsewhere herein.

In some implementations, ASBR 210 may determine, based on entries in the first routing table, one or more next-hop IPv4 interface addresses associated with respective interfaces of peer device 220. For example, the next-hop IPv4 interface addresses associated with the respective interfaces of peer device 220 may include IPv4 interface addresses that were stored in the first routing table of ASBR 210 based on the BGP peering session with peer device 220, and based on the egress peer engineering configuration of ASBR 210. Additionally, or alternatively, the IPv4 interface addresses may include IPv4 interface addresses associated with routes (e.g., label distribution protocol (LDP) routes, label-switched path (LSP) routes, service routes, or the like) that are stored in one or more routing tables associated with ASBR 210. In some implementations, ASBR 210 may execute the address resolution protocol, and may map an IPv4 interface address of peer device 220 to a hardware address (e.g., a MAC address, or the like). In this way, ASBR 210 may determine IPv4 interface addresses associated with peer device 220, and may map the IPv4 interface addresses to IPv6 interface addresses to enable egress peer engineering using IPv4-mapped IPv6 addresses, as described below.

As further shown in FIG. 4, process 400 may include generating an IPv6 interface address based on the IPv4 interface address (block 420), and storing the IPv6 interface address in a routing table (block 430). For example, ASBR 210 may generate an IPv4-mapped IPv6 interface address associated with peer device 220, and may store the IPv4-mapped IPv6 interface address in a second routing table (e.g., an IPv6 MPLS routing table).

In some implementations, ASBR 210 may generate an IPv4-mapped IPv6 address based on generating an IPv6 address that includes, for example, an 80-bit prefix of bits (e.g., zeros), 16 bits that include a particular value (e.g., one), and 32 bits that contain the IPv4 interface address. For example, for a particular IPv4 interface address (e.g., "104.0.0.0"), ASBR 210 may generate an IPv4-mapped IPv6 address using a particular format (e.g., "::ffff:104.0.0.0"). For example, the consecutive colons (e.g., "::") may represent the 80-bit prefix of bits (e.g., zeros), the "ffff" may represent the 16 bits that include the particular value (e.g., one), and "104.0.0.0" may represent the IPv4 interface address. In some implementations, ASBR 210 may generate an IPv4-mapped IPv6 interface address based on a format different than the format described above.

In some implementations, ASBR 210 may generate an IPv4-mapped IPv6 address for each respective interface of peer device 220 associated with an inter-AS link. Additionally, ASBR 210 may store the IPv4-mapped IPv6 addresses in the second routing table. For example, ASBR 210 may store an entry for the IPv4-mapped IPv6 interface address in the second routing table. Additionally, ASBR 210 may map the IPv6 interface address to a physical address (e.g., a MAC address) associated with the interface. In this way, ASBR 210 may enable egress peer engineering using IPv4-mapped IPv6 interface addresses, as described elsewhere herein.

As further shown in FIG. 4, process 400 may include receiving, from the eBGP peer device, a service route that includes the IPv6 interface address (block 440). For example, ASBR 210 may receive, from peer device 220, a BGP message that includes a service route including an IPv6 prefix and the IPv6 interface address. In some implementations, peer device 220 may provide a BGP message to advertise that peer device 220 is a next-hop for an IPv6 prefix. In this case, peer device 220 may generate an IPv4-mapped IPv6 interface address associated with the IPv4 interface address of peer device 220, and may advertise the IPv4-mapped IPv6 address as the next-hop for the IPv6 prefix.

In some implementations, ASBR 210 may receive the service route that includes the IPv6 interface address, and may identify that the IPv6 interface address is an IPv4-mapped IPv6 interface address (e.g., based on the format of the IPv6 interface address). Additionally, ASBR 210 may determine whether ASBR 210 includes an entry, corresponding to the IPv6 interface address, stored in the second routing table (e.g., based on performing a lookup). In some implementations, ASBR 210 may determine that the entry, corresponding to the IPv6 interface address, is stored in the second routing table and may resolve the service route. In this way, ASBR 210 may advertise the service route to routing device 230 (e.g., iBGP), as described below.

As further shown in FIG. 4, process 400 may include providing the service route to a routing device (block 450). For example, ASBR 210 may provide, to routing device 230, a BGP message (e.g., using iBGP) that includes the service route. In some implementations, ASBR 210 and routing device 230 may establish an iBGP peering session. For example, ASBR 210 and routing devices 230 within autonomous system 240-1 may constitute an iBGP mesh.

In some implementations, ASBR 210 may provide a BGP message to routing device 230 that includes the IPv6 prefix and the IPv6 interface address of peer device 220 as the next-hop for the IPv6 prefix. In some implementations, ASBR 210 may include multiple inter-AS links to peer device 220. In such cases, ASBR 210 may be configured with a BGP extension (e.g., "BGP add-paths extension"), and may advertise multiple next-hop addresses (e.g., associated with interface addresses of peer device 220) for the prefix. For example, ASBR 210 may include a path identifier (e.g., included in an NLRI field) in each respective BGP message including the service route.

In this way, routing device 230 may receive the service route, and may store an entry associated with the service route in a routing table (e.g., an IPv6 routing table). Additionally, routing device 230 may receive, from ASBR 210, a BGP-LU route, and may associate a label with the service route, as described below.

As further shown in FIG. 4, process 400 may include providing a BGP-LU route to the routing device (block 460). For example, ASBR 210 may provide a message, to routing device 230, including a BGP-LU route. For example, the BGP-LU route may include an address (e.g., a loopback IP address) associated with ASBR 210 as a BGP next-hop for the IPv6 interface address associated with peer device 220. In some implementations, ASBR 210 may include a label (e.g., a 20-bit label value) with the BGP-LU route. For example, ASBR 210 may assign a label to the IPv6 interface address of peer device 220, and may store (e.g., in the second routing table) the label, the associated IPv6 interface address, and an operation (e.g., a "POP" operation) associated with the label. In some implementations, if ASBR 210 and peer device 220 include multiple inter-AS links, then ASBR 210 may assign labels to each interface associated with peer device 220. Additionally, ASBR 210 may assign a path identifier to each inter-AS link, and may provide the path identifier to routing device 230.

In this way, ASBR 210 may receive, from routing device 230, network traffic that includes the label, and may forward the network traffic based on the label. For example, routing device 230 may receive network traffic that includes a destination address associated with the IPv6 prefix. Additionally, routing device 230 may perform an operation (e.g., a "push" operation that pushes a label onto a packet) in association with the network traffic. In this way, routing device 230 may control the next-hop address to which ASBR 210 forwards the network traffic. For example, ASBR 210 may receive network traffic that includes the label, and may perform an operation (e.g., a "POP" operation, such as removing the label), and may forward the traffic based on the label. Additionally, implementations described herein may enable MPLS tunneling using IPv6. Implementations described herein may enable an ASBR to resolve service routes that include IPv6 prefixes and/or IPv6 interface addresses, and may enable the ASBR to support egress peer engineering using BGP-LU. In this way, implementations described herein may reduce a quantity of unresolvable service routes, thereby conserving processor and/or memory resources of an ASBR, and conserving network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
   a memory; and
   one or more processors to:
      determine an Internet Protocol version R (IPvR) interface address associated with a second device,
         R being greater than or equal to four,
         the first device and the second device being associated with an external border gateway protocol peering session;
      store the IPvR interface address in a first routing table;
      generate a particular Internet Protocol version S (IPvS) interface address based on the IPvR interface address associated with the second device,
         S being greater than or equal to six and different than R;
      store the particular IPvS interface address in a second routing table based on generating the particular IPvS interface address;
      receive, from the second device, a service route that includes an IPvS interface address;
      determine that the IPvS interface address is the particular IPvS interface address based on a lookup of the second routing table,
         the particular IPvS interface address being associated with a destination device;
      provide, to a third device, the service route based on receiving the service route,
         the first device and the third device being associated with an internal border gateway protocol peering session;
      provide, to the third device, a labeled route based on providing the service route to the third device,
         the labeled route including a label associated with the particular IPvS interface address and stored, in the second routing table, as associated with the particular IPvS interface address,
            the label being associated with a particular operation;
      receive network traffic, including the label, from the third device;
      perform, based on receiving the network traffic including the label, the particular operation; and
      forward the network traffic to the destination device based on the label.

2. The first device of claim 1, where the one or more processors are further to:
   establish the external border gateway protocol peering session with the second device; and
   where the one or more processors, when determining the IPvR interface address associated with the second device, are to:
      determine the IPvR interface address associated with the second device based on establishing the external border gateway protocol peering session with the second device.

3. The first device of claim 1, where the one or more processors are further to:
   receive configuration information that enables egress peer engineering; and
   where the one or more processors, when determining the IPvR interface address associated with the second device, are to:
      determine the IPvR interface address associated with the second device based on receiving the configuration information that enables egress peer engineering.

4. The first device of claim 1, where the one or more processors are further to:
   resolve the service route based on receiving the service route from the second device; and
   where the one or more processors, when providing the service route, are to:
      provide the service route based on resolving the service route.

5. The first device of claim 1, where the one or more processors are further to:
   assign the label to the IPvS interface address; and
   where the one or more processors, when providing the labeled route, are to:
      provide the labeled route based on assigning the label to the IPvS interface address.

6. The first device of claim 1, where the one or more processors, when performing the particular operation, are to:
   perform an operation associated with removing the label from the network traffic; and
   where the one or more processors are further to:
      provide, to the second device and via an interface, the network traffic, the interface being associated with the particular IPvS interface address.

7. The first device of claim 1,
   where the one or more processors, when generating the particular IPvS interface address based on the IPvR interface address, are to:
      map the particular IPvS interface address to the IPvR interface address associated with the second device.

8. A non-transitory computer-readable medium storing instructions, the instructions comprising:
   one or more instructions that, when executed by one or more processors of a first device, cause the one or more processors to:
      determine an Internet Protocol version R (IPvR) address associated with a second device,
         R being greater than or equal to four,
         the first device being associated with a first autonomous system, and
         the second device being associated with a second autonomous system that is different than the first autonomous system;
      store the IPvR address in a first routing table;
      generate a particular Internet Protocol version S (IPvS) address based on the IPvR address associated with the second device, S being greater than or equal to R;
store the particular IPvS address in a second routing table based on generating the particular IPvS address;
receive, from the second device, a service route that includes an IPvS address and an IPvS prefix;
determine that the IPvS address is the particular IPvS address based on a lookup of the second routing table,
the particular IPvS address being associated with a destination device;
provide, to a third device, the service route based on receiving the service route, the third device being associated with the first autonomous system;
provide, to the third device, a labeled route based on providing the service route to the third device,
the labeled route including a label associated with the particular IPvS address and stored, in the second routing table, as associated with the particular IPvS address,
the label being associated with a particular operation;
receive network traffic, including the label, from the third device;
perform, based on receiving the network traffic including the label, the particular operation; and
forward the network traffic to the destination device based on the label.

9. The non-transitory computer-readable medium of claim 8, where the one or more instructions, when executed by the one or more processors, further cause the one or more processors to:
resolve the service route using the first routing table; and
where the one or more instructions, that cause the one or more processors to provide the service route, cause the one or more processors to:
provide the service route based on resolving the service route.

10. The non-transitory computer-readable medium of claim 8, where the one or more instructions, when executed by the one or more processors, further cause the one or more processors to:
assign the label to the particular IPvS address; and
where the one or more instructions, that cause the one or more processors to provide the labeled route, cause the one or more processors to:
provide the labeled route to the third device based on assigning the label to the particular IPvS address.

11. The non-transitory computer-readable medium of claim 8, where the one or more instructions, when executed by the one or more processors, further cause the one or more processors to:
assign the particular operation to the label.

12. The non-transitory computer-readable medium of claim 8, where the one or more instructions, when executed by the one or more processors, further cause the one or more processors to:
provide, to the second device, the network traffic via an interface associated with the particular IPvS address based on receiving the network traffic that includes the label from the third device.

13. The non-transitory computer-readable medium of claim 8, where the one or more instructions, when executed by the one or more processors, further cause the one or more processors to:
map the IPvR address to a media access control address of the second device; and
where the one or more instructions, that cause the one or more processors to generate the particular IPvS address based on the IPvR address, cause the one or more processors to:
generate the particular IPvS address based on mapping the IPvR address to the media access control address.

14. The non-transitory computer-readable medium of claim 8, where the one or more instructions, when executed by the one or more processors, further cause the one or more processors to:
receive configuration information that enables egress peer engineering; and
where the one or more instructions, that cause the one or more processors to determine the IPvR address associated with the second device, cause the one or more processors to:
determine the IPvR address associated with the second device based on receiving the configuration information that enables egress peer engineering.

15. A method, comprising:
determining, by a first device, an Internet Protocol version R (IPvR) address associated with a second device,
R being greater than or equal to four,
the first device and the second device being associated with an external border gateway protocol peering session;
storing, by the first device, the IPvR address in a first routing table;
generating, by the first device, a particular Internet Protocol version S (IPvS) address based on the IPvR address associated with the second device,
S being greater than or equal to six;
storing, by the first device, the particular IPvS address in a second routing table based on generating the particular IPvS address;
receiving, by the first device and from the second device, a service route that includes an IPvS address;
determining, by the first device, that the IPvS address is the particular IPvS address based on a lookup of the second routing table,
the particular IPvS address being associated with a destination device;
providing, by the first device and to a third device, the service route based on receiving the service route;
providing, by the first device and to the third device, a labeled route based on providing the service route,
the labeled route including a label associated with the particular IPvS address associated with the second device and stored, in the second routing table, as associated with the particular IPvS address,
the label being associated with a particular operation;
receiving, by the first device and from the third device, network traffic including the label;
performing, by the first device and based on receiving the network traffic including the label, the particular operation; and
forwarding, by the first device, the network traffic to the destination device based on the label.

16. The method of claim 15, further comprising:
identifying a plurality of IPvR addresses, based on the first routing table, that are associated with a plurality of service routes;
the plurality of IPvR addresses including the IPvR address, and
the plurality of service routes including the service route; and where determining the IPvR address comprises:
   determining the IPvR address based on identifying the plurality of IPvR addresses.
17. The method of claim 15, further comprising:
assigning a path identifier to an inter-AS link associated with the particular IPvS address; and
where providing the labeled route to the third device comprises:
   providing the labeled route to the third device based on assigning the path identifier to the inter-AS link.
18. The method of claim 15, further comprising:
removing the label based on receiving the network traffic from the third device; and
providing the network traffic to the second device via an interface associated with the particular IPvS address based on removing the label.
19. The method of claim 15, further comprising:
assigning the label to the particular IPvS address; and
assigning the particular operation to the label based on assigning the label to the particular IPvS address.
20. The method of claim 15, further comprising:
storing, in the second routing table, an entry associated with the particular IPvS address;
resolving the service route based on the entry; and
where providing the service route comprises:
   providing the service route based on resolving the service route.

* * * * *